UNITED STATES PATENT OFFICE.

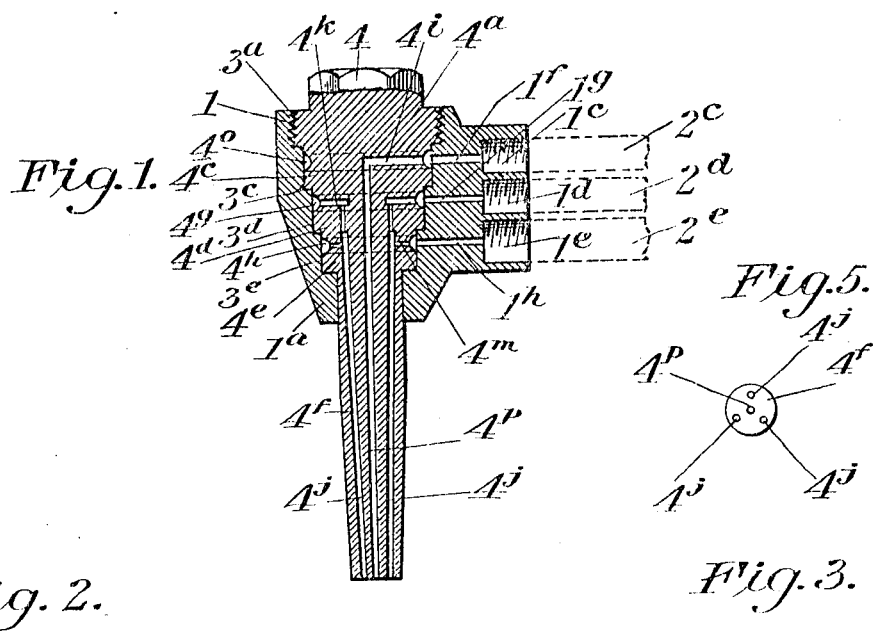

ANGUS R. GROSS, OF BALTIMORE, MARYLAND.

BLOW-TORCH.

1,274,260.  Specification of Letters Patent.  Patented July 30, 1918.

Application filed March 17, 1917, Serial No. 155,576. Renewed December 24, 1917. Serial No. 208,700.

*To all whom it may concern:*

Be it known that I, ANGUS R. GROSS, a citizen of the United States, residing at Baltimore city, State of Maryland, have invented certain new and useful Improvements in Blow-Torches; and I hereby declare that the following is a full, clear, and exact description thereof, reference being had to the accompanying drawings, which form part of this specification.

This invention relates to blow torches which are used in metal working for brazing and cutting metal by means of intense heat generated by the combustion of gases, such as acetylene and oxygen; the present invention has particular reference to the construction of the head and nozzle of such torches and its objects are (1) to provide a blow torch having a novel removable interchangeable nozzle which requires only the manipulation of one part, the nozzle itself, to attach it to or detach it from the head; (2) to make the nozzle in such manner that back firing of the gases in the head or nozzle and injury of the head or nozzle thereby will be prevented; (3) to insure proper mixing of the gases within the nozzle, and to bring both the heating flame and the cutting jet readily and easily under the control of the operator; and (4) to make the working head and nozzle small and compact so that the operator can more easily observe and correctly apply the flame while operating the torch.

The invention consists in the novel construction of the torch head and the one-piece removable interchangeable nozzle, and the companying drawings illustrate a practical embodiment thereof, and I will explain the invention in connection with said drawings to enable others skilled in the art to manufacture and use the invention.

In said drawings:

Figure 1 is a longitudinal vertical sectional view through the nozzle and head of the torch adjusted in operative position.

Fig. 2 is a view of the nozzle detached.

Fig. 3 is an end view of the head and nozzle.

Fig. 4 is a top plan view of Fig. 3; and

Fig. 5 is a bottom plan view of the nozzle tip.

In the drawings 1 designates the head of the torch which is preferably formed of a single casting, which head is cylindric and preferably has its lower end tapered externally as at $1^a$; and it has a laterally extending shank $1^b$ by which it may be connected to the gas supply pipes in the usual or other preferred manner.

In this shank $1^b$ are three bores $1^c$, $1^d$, $1^e$ which may be internally threaded for engagement with pipes $2^c$, $2^d$, $2^e$ which may form part of the torch body and connect the head with a suitable handle, not shown, in the usual manner. Any suitable gases may be used, for example the pipe $2^c$ for high pressure oxygen, the pipe $2^d$ for pre-heating oxygen, and the pipe $2^e$ for acetylene.

Extending through the body 1 preferably at right angles to the sockets $1^c$, $1^d$, $1^e$ is a bore which is of small diameter at bottom and large diameter at top; and the upper end of this bore is internally threaded as at $3^a$; below this threaded portion the bore is shown as formed with a circular step $3^c$ preferably slightly smaller in diameter than the part $3^a$ and opposite the socket $1^c$. Below the step $3^c$ is a second smaller step $3^d$ practically opposite the bore $1^d$; and below the bore $1^d$ is a third step $3^e$ smaller than the step $3^d$ and preferably opposite the bore $1^e$.

Removably secured within the bore of the head is the upper end of a removable interchangeable nozzle, which preferably has a squared or angular cap 4 on its upper end by which it can be turned, and below this cap is an externally threaded portion $4^a$ engaging the threaded portion $3^a$. Below this threaded portion $4^a$ are circular portions $4^c$, $4^d$, $4^e$ respectively closely fitting within the steps $3^c$, $3^d$, $3^e$ of the bore; and below portion $4^e$ the nozzle has a cylindric portion $4^f$ which extends through the opening in the head and projects below the same forming the nozzle proper. In the part $4^c$ is an annular groove $4^c$ that communicates with the high pressure oxygen supply by means of a port $1^f$ in the head. In the part $4^d$ is an annular passage $4^g$ that communicates with the pre-heating oxygen supply or port $1^d$ by passage $1^g$ in the head. In the part $4^e$ is an annular channel $4^h$ that communicates with the acetylene supply or socket $1^e$ by a passage $1^h$ in the head.

Within the nozzle stem is a preferably axially disposed passage $4^p$ which extends to the part $4^c$ and communicates with the channel $4^o$ by a lateral passage $4^i$.

The nozzle is also provided, preferably exterior to the passage $4^p$, with a plurality of passages $4^j$, three being shown, which extend through the stem of the nozzle to the part 4ᵈ and communicate with the channel 4ᵍ by means of transverse passages or bores 4ᵏ.

The passages 4ʲ also communicate with the channel 4ʰ by means of small radial passages or bores 4ᵐ, see Fig. 1.

It will be seen with this arrangement that the passages 4ʲ communicate with the pre-heating oxygen supply and also with the acetylene supply, and that the parts are such that the out flowing oxygen in the passages 4ʲ passes the passages 4ᵐ and creates a suction in the acetylene gas passages 4ᵐ and draws the acetylene out with the oxygen to make the pre-heating flame, the relative amount of oxygen and acetylene employed depending upon the pressure and the relative size of the passages 4ʲ and 4ᵐ. When it is desired to use the cutting flame oxygen is admitted from pipe 2ᶜ to the passage 4ᵖ and produces the desired intense cutting flame.

The supply of the gases can be controlled by valves in the usual manner. With this device it will be seen that there is no expansion chamber in the nozzle in which the gases may expand and ignite or back fire; the rush of the gases through the passages 4ʲ preventing any back firing in these passages and consequently the nozzle is not liable to burn out or the nozzle burn off as frequently happens with the present known torches.

For different work different quantities of gases are required; and to avoid the use of a multiplicity of torches it is customary to provide interchangeable nozzles; heretofore the nozzles have been attached to the head in various ways that required the disconnecting and reconnecting of several various parts in order to substitute one nozzle for another. In my invention I make the nozzles interchangeable and with proper gas passages according to the requirements of the work; and when it is desired to substitute one nozzle for another all that is necessary is to unscrew the nozzle by means of a wrench, or the fingers applied to the cap 4 of the nozzle engaged with the head, lift out such nozzle and then insert a new nozzle and screw it home until it is firmly engaged with the head. It will be seen with my invention there is but one part to remove or replace, the nozzle and its fastening being in one piece; the connection is made at the end of the head farthest removed from the flame; there are no exterior fastenings between the stem end of the nozzle and the head; and the head can be tapered on its under side so as to make a neat small conveniently operated cutting torch. The utility and efficiency of my invention will be readily appreciated by those familiar with blow pipes now in use.

What I claim is:

1. In a blow torch, the combination of a head having a bore extending therethrough, and a plurality of gas supply passages connected with said bore; of a removable nozzle extending entirely through the bore of the head and having a portion fitting the bore, and a stem projecting out of the head at one end of the bore, said stem having a longitudinal passage communicating with one of the said gas supply passages in the head and also having a passage extending through the stem beside the first passage and communicating with the other gas passages, substantially as described.

2. In a blow torch, the combination of a head having a bore extending therethrough and provided with a threaded portion, and a plurality of gas supplying passages connected with said bore; of a removable nozzle extending entirely through the bore of the head and having a portion fitting the bore of the head and provided with a threaded portion engaging the internally threaded portion of the bore to fasten the nozzle therein; said nozzle also having a stem projecting out of the head at one end of the bore and a longitudinal passage extending through the stem and communicating with one of the gas supply passages, and also having other passages extending through the stem beside the first passage and communicating with the other gas supply passages, said nozzle being removable and replaceable, substantially as described.

3. In a blow torch, the combination of a head having a bore extending therethrough provided with a threaded portion at its larger end and a shank provided with a plurality of passages for connection with heating gas supplies; with a removable nozzle having a portion adapted to fit the opening of the head and provided with a threaded portion engaging the threaded portion of said bore to secure the nozzle therein; said nozzle also having a reduced stem portion extending through the smaller end of the bore and projecting out of and from the head, said stem having an axially disposed passage extending therethrough and communicating with the uppermost gas channel, and said stem also having another passage extending therethrough communicating with both the other gas channels, substantially as described.

4. In a blow torch, the combination of a head having a bore extending therethrough and provided with a threaded portion at its larger end, and a shank provided with three passages for connection with gas supplies communicating with the bore; with a removable nozzle having a portion adapted to fit in the opening of the head and provided with a threaded portion engaging the threaded portion of said opening to secure the nozzle therein, and also having annular channels respectively communicating with the adjacent gas supply passages, said nozzle also having a reduced stem portion extending through the reduced end of the bore and projecting from the head, said stem having a bore extending therethrough communicating with one annular channel and also having another bore or passage extending therethrough communicating with both the other annular channels, substantially as described.

5. A blow torch, comprising a body having an axially disposed bore having three annular steps between its upper and lower ends, said steps successively increasing in diameter, said body also having three passages respectively leading from said steps and adapted to be respectively connected to gas supplies; with a removable interchangeable nozzle having a body portion fitted within the bore of the head and provided with three step-portions respectively engaging the step-portions of the bore, each step-portion of the nozzle having an annular channel communicating with the adjacent gas passage in the head; said nozzle also having a reduced stem portion extending out of the body when the nozzle is engaged therewith, said stem having a passage extending to and communicating with the annular channel in one step of the nozzle and having another passage extending to and communicating with the annular channel in another step of the nozzle, the latter passage also communicating with the channel in the third step of the nozzle, substantially as described.

6. A blow torch comprising a body having an axially disposed bore threaded internally at its upper end and having three annular steps between its upper and lower end, said steps increasing in diameter, said body also having three passages leading respectively from said steps and adapted to be respectively connected to a gas supply; with a removable interchangeable nozzle having a body portion fitted within the bore of the head provided with an externally threaded portion to engage the threaded portion of the bore, and with three step portions respectively engaging the step portions of the bore, and said nozzle having a reduced stem portion extending out of the body when the nozzle is engaged therewith; said stem having a passage extending to and communicating with the gas passage in one step, and having other passages extending to and communicating with the gas passage in another step, the latter passages also communicating with the channel in the third step, substantially as described.

7. A blow torch comprising a body having an axially disposed bore threaded internally at its upper end and having three annular steps between its upper and lower end, said steps increasing in diameter, said body also having three passages leading respectively from said steps and adapted to be respectively connected to the high pressure oxygen, and the pre-heating oxygen and acetylene gas supplies; with a removable interchangeable nozzle having a body portion fitted within the bore of the head provided with an externally threaded portion to engage the threaded portion of the bore, and with three step portions respectively engaging the step portions of the bore, each step portion of the nozzle having an annular channel communicating with the adjacent gas passage in the head, and said nozzle having a reduced stem portion, extending out of the body when the nozzle is engaged therewith; said stem having a passage extending to and communicating with the annular channel in one step of the nozzle, and having other passages extending to and communicating with the annular channel in another step of the nozzle, the latter passages also communicating with the channel in the third step of the nozzle, substantially as described.

In testimony that I claim the foregoing as my own, I affix my signature.

ANGUS R. GROSS.